FIG_4
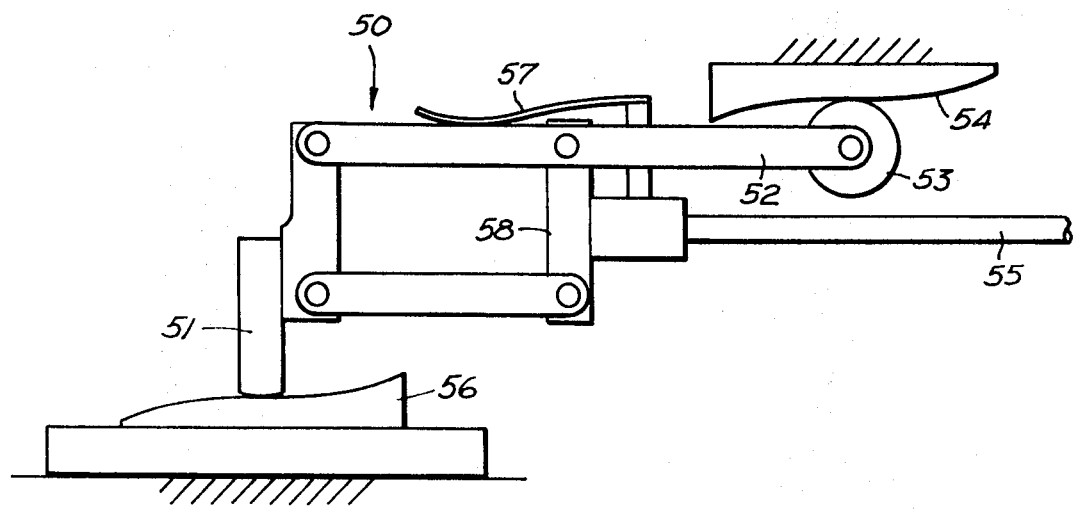
FIG_5
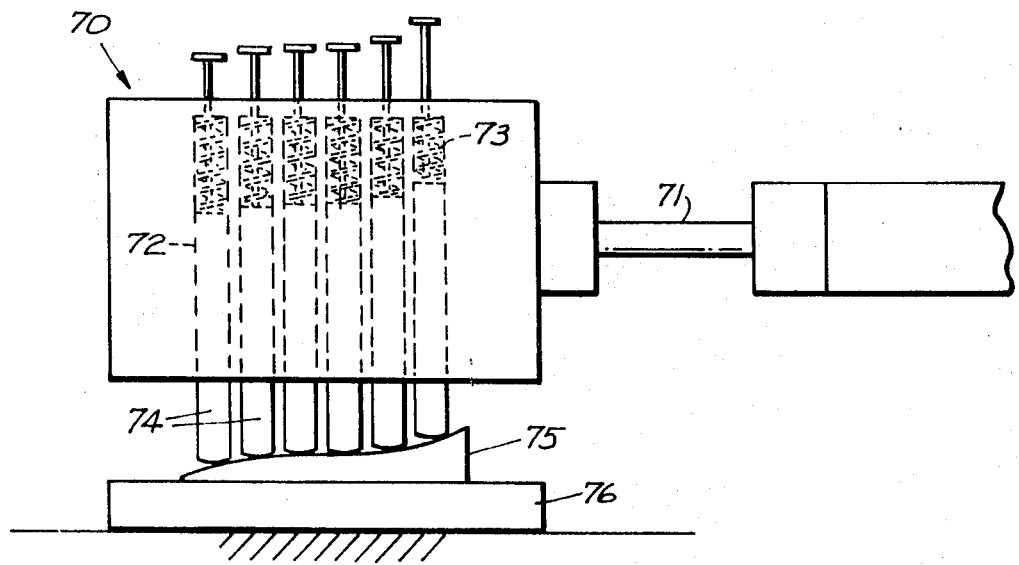
WILLIAM E. HUMPHREY
INVENTOR.
BY Townsend & Townsend
ATTORNEYS 3,605,345
**LENS SURFACE GRINDING METHOD
AND APPARATUS**
William E. Humphrey, Oakland, Calif., assignor to Optical
 Research and Development Corporation, Oakland,
 Calif.
Filed June 9, 1969, Ser. No. 831,437
Int. Cl. B24b 5/00
U.S. Cl. 51—67                                          18 Claims

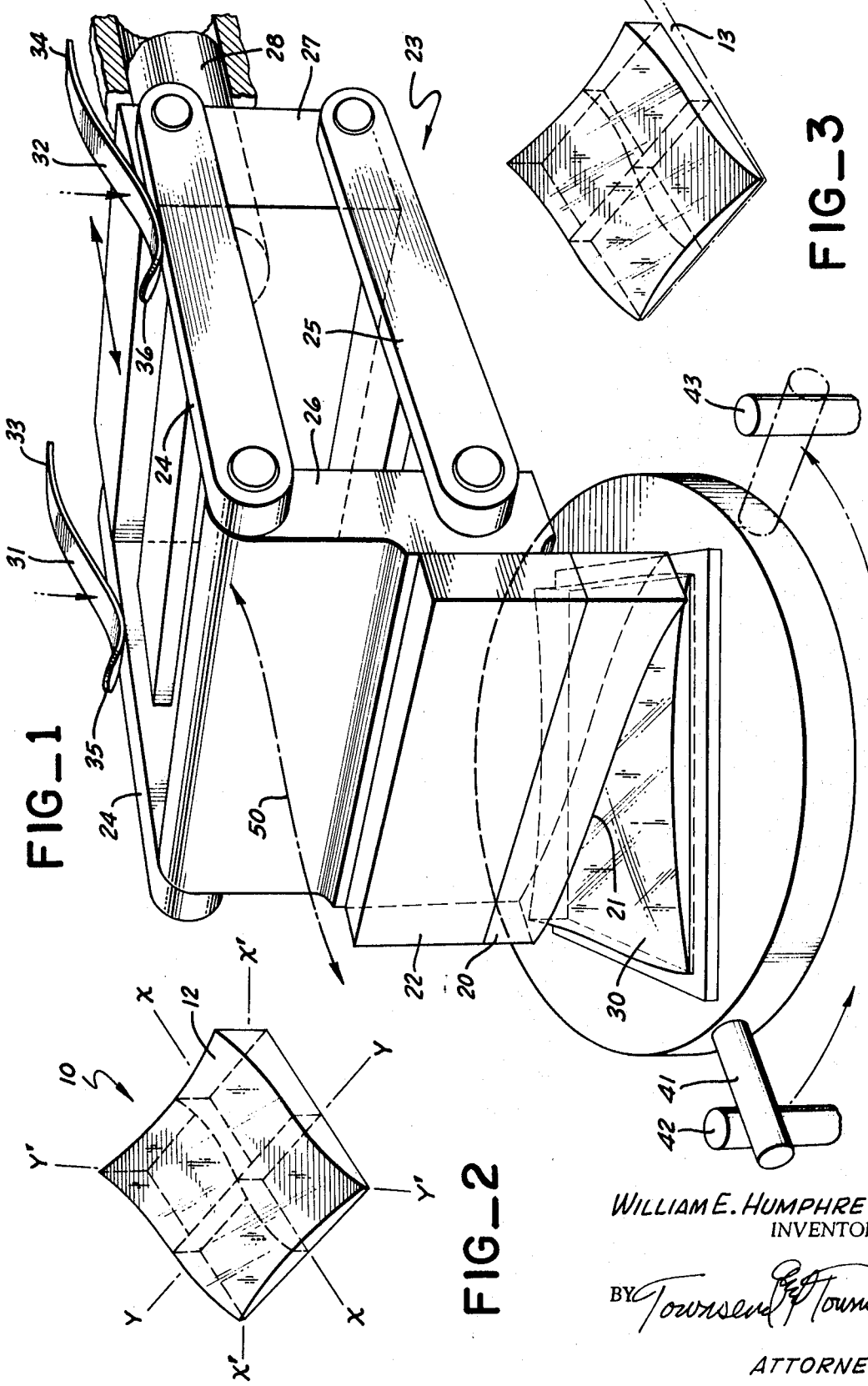

ABSTRACT OF THE DISCLOSURE

A method and apparatus for grinding a complex optical surface on a lens element to provide between the lens element surface and a reference surface, a lens thickness variation defined by the function Z $(x, y)$ where $x$ and $y$ form a coordinate system in which the function Z $(x, y)$ defines the lens element thickness at any point $(x_n, y_m)$, the function Z $(x, y)$ rotatable to a coordinate system of coodinates $x'$ and $y'$ in which the function $$Z(x', y') = f(x') + f(y')$$

A grinding tool having a bearing surface defined by the function $f$ is scraped across the lens element surface in the presence of an abrasive, in the direction of the coordinates of the $x'-y'$ coordinate system successively, with resilient pressure applied to the tool in the direction of the lens element surface.

---

This invention relates to a new and improved method and apparatus for grinding complex lens surfaces such as the surface of a variable power spherical lens element.

In U.S. Pat. No. 3,305,294 there is described a variable power spherical lens formed by two variable power lens elements mounted for translation relative to each other. Each of the lens elements is formed with a surface of complex curvature so that the thickness across the lens element is defined by the function $$Z(x, y) = K\left(\frac{x^3}{3} + xy^2\right)$$

This function defines the thickness of the lens at any point $(x_n, y_m)$ in a planar coordinate system defined by the coordinates $x$ and $y$. One surface of the lens or an intermediate surface provides a reference surface for measuring the thickness of the lens. When the reference surface is a plane surface the ground surface of the lens is of complex curvature described by third order terms along the $x$ and $y$ axes. This lens equation may also include terms of lower power designed to introduce other desired properties into the lens element, and reference is made to the above United States patent and to U.S. patent application Ser. No. 617,573, filed on Feb. 21, 1967, entitled, "Variable Power Lens and System" now Pat. 3, 507,565 issued Apr. 21, 1970 for more complete description of the organized lens equation referred to therein.

Such complex lens surfaces cannot be ground or shaped with conventional lens grinding equipment and severe difficulties are encountered even with specialized grinding machines. In particular, cylindrical error and astigmatism can be introduced due to the failure to maintain the coefficients of the various terms of the lens equation constant and equal during grinding and a failure to measure coordinates from the same point of origin. For example, 90° to permit scraping and shaping of the lens element the slight misplacement of cams in specialized grinding equipment will introduce such errors.

It is therefore an object of the present invention to provide a new and improved method and apparatus for grinding and shaping complex lens surfaces with high optical quality. In particular, it is an object of the invention to provide a method and apparatus for shaping variable power spherical lens elements of the type described above which permit accurate generation of lens surfaces having a range of coefficients in the lens equation and yet which have a simplicity adaptable for commercial production.

A unique principle upon which the present invention is based is that the thickness function Z $(x, y)$ for the variable power spherical lens element mentioned above can be rotated to a coordinate system formed by coordinates $x'$ and $y'$ in which the function $Z(x', y') = f(x') + f(y')$. According to the invention, advantage is taken of this unique principle of the variable power spherical lens equation by providing a grinding or shaping tool having a bearing surface whose configuration is defined by the function $f$. Mathematical analysis indicates that in order to provide the variable power spherical lens equation, the function $f$ must include a term $W^3$ and any additional terms required to impart desirable properties such as lens thinness or shaping. A feature and advantage of the present invention is that a shaping tool having a bearing surface configuration defined by the function $f$ can be scraped across the lens element surface in the direction of first one coordinate and then the other coordinate of the $x'-y'$ coordinate system ultimately shaping the lens surface to provide a lens element having a thickness variation in the $x-y$ coordinate system defined by the variable power spherical lens equation referred to above. This surprising result permits the formation of complex lens surfaces of certain types in a relatively simple manner.

According to the invention any complex lens surface for a lens whose thickness is defined by a function Z $(x, y)$ can be formed in this manner if there exists a coordinate system to which the function Z $(x, y)$ can be rotated such that Z $(x', y')$ is determined by the sum, $f(x') + f(y')$. If this is the case, the invention contemplates providing a grinding tool having an elongate bearing surface formed to provide along its longitudinal direction spatial variations between the bearing surface and the reference surface from which the lens thickness is measured, defined by the function $f$. The lens element starting material to be shaped by the grinding tool is mounted with reference to the $x'-y'$ coordinate system. The grinding tool is in turn mounted for scraping the bearing surface along the surface of the lens element in the direction of each of the coordinates of the $x'-y'$ coordinate system, with the longitudinal axis of the grinding tool oriented perpendicular to the direction of motion. The grinding tool is also mounted to permit movement of the bearing surface in the direction of the optical axis of the lens element while maintaining resilient pressure on the grinding tool in the direction of the lens surface. Relative translation is provided between the grinding tool bearing surface and the lens element surface in the direction of a coordinate of the $x', y'$ coordinate system for scraping the surface of the lens element with an abrasive powder, for example, while permitting movement of the grinding tool in a direction generally perpendicular to the lens element in response to variable surface configurations of the lens element. The lens element is then rotated in the direction of the other coordinate of the $x', y'$ coordinate system. The process can be repeated, returning to the original position for finishing the surface.

Because the function $Z(x', y') = f(x') + f(y')$ in the $x'-y'$ coordinate system, any cross section of the desired lens surface parallel to the $x'$ coordinate is similar to the lens surface at any other such cross section and differs only in height depending upon the value of the other coordinate, namely, $y'$. The same is true for any cross sections in the $y'$ direction. Furthermore, any cross section of the lens surface parallel to a coordinate is similar to any other lens surface cross section parallel to either coordinate, varying only in height. The same tool can thus be used in shaping the lens along the direction of each of the coordinates of the prime coordinate system. Because the grinding tool and bearing surface have a "floating" mount permitting motion in the direction of the optical axis of the lens element, the tool while shaping the lens surface in the direction of one of the coordinates follows and conforms to the shape of the surface along the direction of the other coordinate. As a result, the complex lens surface results in a lens having a thickness defined by the original function $Z(x, y)$ in the $x-y$ coordinate system.

A feature and advantage of the present invention is that the grinding tool is self-correcting, reducing high frequency components or defects formed in the bearing surface of the grinding tool and wearing in such a way as to insure that $f(x) = f(y)$. The invention contemplates providing a grinding tool having a bearing surface formed to provide along its longitudinal direction spatial variations between the bearing surface and the reference surface from which the lens thickness is measured, defined by a function of the general type $$f(w) = A + Bw + Cw^2 + Dw^3$$

The constant A defines a section of glass or other optical material of constant thickness which is optically neutral and provides structural stability for the lens. The coefficient B defines a variable thickness component or prism component useful for optimizing lens thickness and performance. The constant C imparts a spherical shape to the lens element. Finally, the coefficient D defines the variable spherical power component of the lens element. With the constants B and C=0, so that the function $f(w)$ equals a constant plus $Dw^3$, then the variable power sphericals lens equation $$Z(x, y) = K\left(\frac{x^3}{3} + xy^2\right)$$

results after transformation to the $x-y$ coordinate system. If the constants B and D are chosen equal to zero, then a spherical or, more accurately, a parabolic lens results. It is frequently desirable to employ a non-zero B to optimize surface thickness or slope.

Higher order terms such as a fourth power term can also be used. If $f(w)$ were chosen equal to $Ew^4$, the constant E defines a variable power spherical lens having accelerated variation of power with constant motion between a pair of lens elements so formed. Such a lens element does not generally have practical use so that the present invention is generally unconcerned with terms beyond the third power, and is rather concerned with functions in which the terms beyond the third power are negligible. The coefficients of higher power terms are more difficult to grind and tend to be eliminated by the self-correcting feature of the grinding tool, namely, that "high frequency" components and defects in the grinding tool bearing surface are reduced during the grinding process.

In practicing the present invention, it is advantageous to start off with a lens element starting block having a surface molded approximately to the desired surface to be shaped by the grinding tool. A flat starting surface provides excessive wear on portions of the bearing surface of the grinding tool and requires excessive time. With a starting surface molded approximately to the desired shape the bearing surface bears more uniformly across the surface of the lens element and the grinding tool resiliently follows to a certain extent the preformed surface configuration of the lens element. In order to permit motion of the grinding tool in a direction perpendicular to the lens element surface, the grinding tool, according to one embodiment of the invention, is mounted on a parallelogram structure for vertical movement relative to the lens element surface during translation back and forth across the working surface. After shaping has been accomplished for a period of time in the direction of one of the coordinates of the prime coordinate system, the lens element and grinding tool are rotated 90° with respect to each other to permit shaping in the direction of the other coordinate system. The "floating" nature of the grinding tool bearing surface, conforming to the already formed surface of the lens element is a useful feature of the machine but can be accomplished in a variety of ways.

A rocking motion of the grinding tool can also be provided in order to introduce cylindrical components into the lens element. However, such components are normally considered objectionable, the grinding tool preferably being rigidly mounted with respect to any rocking type motion transverse to the direction of translation across the lens element surface.

Other objects, features and advantages of the present invention will become apparent in the following specification and accompanying drawings.

In the drawings:

FIG. 1 is a diagrammatic view of a lens grinding and shaping apparatus embodying the present invention. A lens element is shown diagrammatically as it would appear in final form. In actual practice a larger element would be used in the grinding stage to help equalize the pressure from the bearing surface of the grind tool across the element at all points.

FIG. 2 is a diagrammatic perspective view, with the vertical scale exaggerated, of a variable power lens element shaped according to the present invention.

FIG. 3 is a diagrammatic perspective view, with the vertical scale exaggerated, of another variable power lens element shaped according to the present invention.

FIG. 4 is a side view of another lens grinding and shaping apparatus modified to control the bearing pressure of the grinding tool on the lens element surface.

FIG. 5 is a side view of another lens grinding and shaping aparatus with multiple grinding tools to increase the grinding surface.

FIG. 2 illustrates a variable power lens element 10 for use in a variable power spherical lens such as that described in U.S. Pat. No. 3,305,294. Such a lens has a variable thickness in the $x, y$ coordinate system defined by the function $$Z(x, y) = K\left(\frac{x^3}{3} + xy^2\right)$$

Cross sections of the lens surface 12 parallel to the $y$ coordinate of the $x-y$ coordinate system have a curvature varying with the square of the value of $y$, the curve being concave on one side of the $y$ axis and convex on the other side. Cross sections of the surface 12 of the lens element parallel to the $x$ axis have a curavature varying with a third power term of $x$ and are therefore S-shaped. In either case, the cross section is of varying height. In this particular illustration, the thickness of the lens 10 is formed with reference to a flat planar surface 11 on one side of the lens element and the surface configuration is exaggerated. Thus, the surface configuration of the surface 12 of the lens has been defined with reference to a planar surface 11 on the other side of the lens. With reference surfaces of different shape, the opposite surface 12 will, of course, assume a different configuration as defined by the lens thickness function Z $(x, y)$. If the lens thickness function Z $(x, y)$ is rotated through 45° from the $x, y$ coordinae system a unique feature of the variable power spherical lens equation is made apparent. In the prime coordinate system, the function $$Z(x', y') = K'(x'^3 + y'^3)$$

where $$K' = \frac{K\sqrt{2}}{3}$$

In a 45° rotation transformation $$x' = \frac{x-y}{\sqrt{2}}$$

and $$y' = \frac{x+y}{\sqrt{2}}$$

Substitution of these variables verifies the above result. Thus, a cross section of the lens parallel to either the $x'$ coordinate or the $y'$ coordinate produces a variation in thickness defined by the third power of a variable whether $x'$ or $y'$. Thus, the surface variation for every cross section of the lens element parallel to one of the primed coordinates is similar.

The variable power spherical lens equation set forth above can be of a more generalized nature, including other terms, as described in U.S. Pat. No. 3,305,294 and copending patent application, Ser. No. 617,573, now Pat. 3,507,565, issued Apr. 21, 1970 referred to above. Thus, as shown in FIG. 3, a prism shaped component 13 of the lens element illustrated in FIG. 2 and defined by a term P$x$ where P is a constant, has been removed from the lens element. Other optical components and corresponding terms which may be included are described in the above noted references.

As noted above, for the lens thickness function Z $(x, y)$ which defines the thickness of a variable power spherical lens element at all points in an $x, y$ coordinate system, there exists an $x', y'$ coordinate system to which the function can be rotated so that the fuction $$Z(x', y') = f(x') + f(y')$$

In the above example, the function $f$ is given by $f(w) = w^3$. Substitution of variables, i.e., a transformation, verifies this conclusion. For a fixed power spherical lens equation, this is true in all coordinate systems to which the lens equation is rotated. However, for a variable power spherical lens equation there is only one coordinate system to which the function can be rotated in which this is true, namely, that the function is equal to the sum of another function with itself for each coordinate separately. Thus, the variable power spherical lens surface is not a surface of rotation as is the spherical lens. Nevertheless, it is found that such complex surfaces can be formed on lenses by shaping the lens in the direction of the coordinaes of the primed coordinate system only.

Thus, according to the present invention a lens shaping or grinding tool is provided for translation along a lens surface to be shaped in the direction of first one of the primed coordinates and then in the direction of the other primed coordinate. The grinding tool is provided with an elongated bearing surface so as to provide a spatial variation between the bearing surface and the reference surface from which the lens element thickness is measured, defined by the function $f$ which in the primed coordinate system describes the thickness variation across the lens element in any cross section parallel to one of the primed coordinates.

As illustrated in FIG. 1, the grinding tool 20 having the bearing surface 21 formed as defined above, is connected to a mount 22 on a parallelogram frame 23. The parallelogram frame is formed by parallel extending arms 24 and 25 pivotally mounted at each end to rigid end blocks 26 and 27. The grinding tool 20 and mount 22 are rigidly connected to one end block 26, while the other end block 27 is connected to the reciprocating bar 28 of a shaper or machine tool, not shown. The tool is normally provided with a slightly rounded bottom surface for grinding.

Upon reciprocation of the parallelogram frame 23, the bearing surface 21 of tool 20 scrapes along the surface of lens element 30 with resilient pressure applied in the direction of the optical axis of the lens element against the surface of the lens by spring elements 31 and 32. The spring elements 31 and 32 are rigidly connected at ends 33 and 34 to the block 27 or other means rigidly connected to bar 28 so that the free ends 35 and 36 of the spring bear down on the arms 24 with uniform resilient force.

The lens element 30 is mounted on a turntable 40 with the $x'+y'$ axes oriented parallel and perpendicular, respectively, to a stop bar 41. The turntable is rotatable 90° between stop means 42 and 43 so that the $x'$ and $y'$ axes of the lens element 30 can be oriented respectively in the direction of reciprocation of the grinding tool. The lens element 30 shown in FIG. 1 is a diagrammatic presentation of a finished element. Normally, a larger lens surface is provided so that the entire surface of the tool bears against the lens element at all times to thereby equalize pressure and wear.

Because the grinding tool is mounted for reciprocation in a generally horizontal plane, with free movement of the tool in a vertical direction in response to the surface configuration of the lens element 30, the bearing surface 21 of the tool 20 gradually begins to following a path similar to that indicated by arrow 50. Thus, during the grinding operation, scraping, with or without the presence of abrasive powder, takes place alternately in the direction of each of the coordinates of the primed coordinate system. Alternation may occur many times so that the grinding tool gradually conforms to the surface in the direction of one coordinate while scraping in the direction of the other coordinate. In the example shown, the reference surface is the planar surface of the lens element adjacent the turntable and ground surface assumes the configuration shown in the examples of FIGS. 2 and 3.

While the tool 20 and parallelogram frame 23 are shown rigidly mounted in FIG. 1, for translation across the lens element surface, a rocking motion can also be provided to introduce a cylindrical component into the lens element surface.

Furthermore, the present invention is applicable for grinding parabolic lens surfaces. Thus, a grinding tool having an elongate bearing surface defining a portion of a parabola is mounted on the grinding apparatus. Scraping is again carried out alternately along two axes of direction perpendicular to each other. This grinding method offers the advantage of fabricating off axis parabolic surfaces without generating a full parabola of revolution.

Polishing the ground lens element surface can also be accomplished with the machine described above by covering the bearing surface of the tool with a pitch or viscous tar which tends to conform to the surface of the lens element.

It is apparent that a variety of other "floating" mounts for the lens grinding machine and tool can be used in addition to the example described herein. In order to equalize the bearing pressure of the grinding tool on the lens element as it passes across the surface of variable height, a modification of the grinding apparatus is shown in FIG. 4 which compensates for variation in the spring constant which would ordinarily result upon expansion and contraction of the spring. A parallelogram frame 50 on which the tool 51 is mounted is provided at its opposite end on the top with a rearward extension 52 on which a roller 53 is mounted for bearing along a camming surface 54 fixed with respect to the frame 50. The frame 50 is reciprocated by the reciprocating bar 55. The camming surface 54 generates the same motion in cross section as the shape along the surface of the lens element 56 against which the tool 51 scrapes. This construction serves the dual function of guiding the tool along the designed cross section and helping the tool trim to the correct shape when the work is rotated. As in the example of FIG. 1, the parallelogram frame 50 pivots about the vertical plate 58 fixed to the reciprocating bar 55.

In FIG. 5 there is shown a lens grinding or shaping apparatus in accordance with the present invention utilizing a plurality of grinding tools in order to increase the grinding bearing surface. In this example a rigid frame 70 is provided fixed at one end to a reciprocating bar 71. Within the frame is formed a plurality of vertical channels 72 in each of which is resiliently mounted by means of a spring 73, a grinding tool 74. Each grinding tool is free to reciprocate under pressure, vertically within its mounting channel. Each of the tools bears resiliently and independently against the surface of lens element 75 fixed on a base 76 with respect to the reciprocating frame 70. By this expedient a large grinding surface area is provided permitting a shorter stroke and higher speed operation. The springs 73 can be, for example, constant tension springs so that the bearing pressure of each tool remains substantially constant.

The embodiments of the present invention described above can be used in shaping dies and molds of stainless steel or other metal for casting glass or plastic in addition to use directly on optical materials for grinding and polishing.

In the following claims, the small letters, $x$, $y$ and $w$ represent variables, while the letters $f$ and $Z$ represent functions of the variables indicated in parentheses adjacent the letters $f$ or $Z$.

I claim:

1. Apparatus for grinding an optical surface to provide between the optical surface and a reference surface, a thickness variation defined by the function $Z(x, y)$, where $x$ and $y$ form a coordinate system in which the function $Z(x, y)$ defines the thickness at any point $(x_n, y_m)$, the function $Z(x, y)$ rotatable to a coordinate system of coordinates $x'$ and $y'$ in which the function $Z(x', y') = f(x') + f(y')$, comprising: an elongate grinding tool having a bearing surface formed to provide along its longitudinal direction, spatial variations between the bearing surface and said reference surface defined by the function $f$; means mounting said optical surface with reference to the $x'$—$y'$ coordinate system; means mounting said grinding tool for scraping the bearing surface along the optical surface in the direction of one coordinate of the $x'$—$y'$ coordinate system, the longitudinal axis of the grinding tool oriented parallel to the other coordinate of the $x'$—$y'$ coordinate system, said grinding tool mounted to permit movement of the grinding tool in a direction generally perpendicular to the optical surface; means providing relative motion between said grinding tool and the optical surface in the direction of a coordinate of the $x'$—$y'$ coordinate system; means applying resilient pressure to the grinding tool in the direction of the lens surface for scraping the surface while permitting movement of the grinding tool in the direction of the optical axis of the lens element in response to variable surface configurations of the lens element; and means for rotating the lens element and grinding tool 90° with respect to each other to permit scraping in the direction of either coordinate of the $x'$—$y'$ coordinate system.

2. Apparatus for grinding an optical surface as set forth in claim 1 wherein $f$ is a function of the general form $f(w) = A + Bw + Cw^2 + Dw^3$, where A defines a constant thickness neutral optical component of the optical surface chosen to at least satisfy minimum structural requirements, B is a constant defining a prism component of the optical surface, C is a constant defining a spherical lens component of the optical surface, and D is a constant defining a variable power spherical lens component of the optical surface.

3. Apparatus for grinding an optical surface as set forth in claim 2 wherein C=0.

4. Apparatus for grinding an optical surface as set forth in claim 2 wherein D=0.

5. Apparatus for grinding an optical surface as set forth in claim 1 wherein $Z(x, y) = E(x^3 + xy^2)$, wherein $$f(w) = \frac{E\sqrt{2}w^3}{3}$$

and wherein $$Z(x', y') = \frac{E\sqrt{2}}{3}(x'^3 + y'^3)$$

E being constant determining the power variation of the optical surface.

6. Apparatus for grinding an optical surface to provide between the optical surface and a reference surface a thickness variation defined by the function $Z(x, y)$, where $x$ and $y$ form a coordinate system in which the function $Z(x, y)$ defines the thickness at any point $(x_n, y_m)$, the function $Z(x, y)$ rotatable to another coordinate system of coordinates $x'$ and $y'$ in which the function $Z(x', y') = f(x') + f(y')$, comprising: an elongate grinding tool having a bearing surface formed to provide along its longitudinal direction spatial variations between the bearing surface and said reference surface defined by the function $f$, where $f$ is a function of the general form $f(w) = A + Bw + Cw^2 + Dw^3$, where A defines a constant thickness neutral optical component of the optical surface chosen to at least satisfy minimum structural requirements, B is a constant defining a spherical lens component of the optical surface, and D is a constant defining a variable power spherical lens component of the optical surface; means mounting the optical surface with reference to the $x'$—$y'$ coordinate system; means mounting said grinding tool for applying resilient pressure between the grinding tool bearing surface and the optical surface; means providing relative translation between the grinding tool and the optical surface in the direction of one coordinate of the $x'$—$y'$ coordinate system, said grinding tool mounted with its longitudinal axis parallel to the other coordinate, said grinding tool mounted to permit movement in the direction of the optical axis of the optical surface in response to variable surface configurations; and means for rotating the optical surface and grinding tool at least 90° with respect to each other for scraping the surface in the direction of either coordinate of the $x'$—$y'$ coordinate system.

7. Apparatus for grinding an optical surface as set forth in claim 6 wherein said means for providing relative translation between the grinding tool and the lens element provides reciprocating motion therebetween.

8. A method for grinding an optical surface to provide between the optical surface and a reference surface a thickness variation defined by the function $Z(x, y)$, where $x$ and $y$ form a coordinate system in which the function $Z(x, y)$ defines the thickness at any point $(x_n, y_m)$, the function $Z(x, y)$ rotatable to a coordinate system of coordinates $x'$ and $y'$ in which the function $Z(x', y') = f(x') + f(y')$ the method comprising: forming an elongate grinding tool having a bearing surface to provide along the longitudinal direction, spatial variations between the bearing surface and said reference surface, defined by the function $f$; positioning the optical surface with reference to the $x'$—$y'$ coordinate system; scraping the grinding tool bearing surface along the optical surface in the direction of one coordinate of the $x'$—$y'$ coordinate system, the longitudinal axis of the grinding tool being parallel to the other coordinate; applying resilient pressure to the grinding tool in the direction of the optical surface while scraping, thereby permitting movement of the grinding tool in the direction of the optical axis of the optical surface in response to variable surface configurations; rotating the optical surface and grinding tool 90° with respect to each other; scraping the grinding tool along the optical surface in the direction of the other coordinate of the $x'-y'$ coordinate system; and applying resilient pressure to the grinding tool in a direction generally perpendicular to the optical surface.

9. A method for grinding an optical surface as set forth in claim 8 wherein $f$ is a function of the general form $f(w) = A + Bw + Cw^2 + Dw^3$, where A defines a constant thickness neutral optical component of the optical surface chosen to at least satisfy minimum structural requirements, B is a constant defining a prism component; C is a constant defining a spherical lens component; and D is a constant defining a variable power spherical lens component of the optical surface.

10. Apparatus for grinding an optical surface to provide between the optical surface and a reference surface, a thickness variation defined by the function $Z(x, y)$, where $x$ and $y$ form a coordinate system in which the function $Z(x, y)$ defines the lens element thickness at any point $(x_n, y_m)$, the function $Z(x, y)$ rotatable to a coordinate system of coordinates $x'$ and $y'$ in which the function $Z(x', y') = f(x') + f(y')$, comprising: an elongate grinding tool having a bearing surface formed to provide along its longitudinal direction, spatial variations between the bearing surface and said reference surface defined by the function $f$ of the general form $$f(w) = A + Bw + Cw^2 + Dw^3$$

means mounting said optical surface with reference to the $x'-y'$ coordinate system; means mounting said grinding tool for scraping the bearing surface along the optical surface in the direction of one coordinate of the $x'-y'$ coordinate system, the longtiudinal axis of the grinding tool oriented parallel to the other coordinate of the $x'-y'$ coordinate system, said grinding tool mounted to permit movement of the grinding tool in a direction generally perpendicular to the optical surface; means providing relative translation between said grinding tool and the optical surface in the direction of a coordinate of the $x'-y'$ coordinate system; and means applying resilient pressure to the grinding tool in the direction of the optical surface for scraping the surface while permitting movement of the grinding tool in the direction of the optical axis of the optical surface in response to variable surface configurations.

11. Apparatus for grinding an optical surface comprising: a lens grinding platform adapted for retaining an optical surface for grinding; at least one grinding tool spaced from said platform in a position to contact an optical surface mounted on said platform, said grinding tool formed with an elongate bearing surface of length sufficient to cover the optical surface to be ground, said bearing surface having a curvature in the longitudinal direction of the general form defined by the function $f(w) = A + Bw + Cw^2 + Dw^3$, where A, B, C and D are constant; means for reciprocating said grinding tool back and forth along said platform in a direction perpendicular to the elongate axis of said grinding tool bearing surface; and resilient biasing means for applying resilient pressure by the grinding tool against an optical surface mounted on said platform while permitting motion of the grinding tool in a direction generally perpendicular to the platform in response to surface configurations.

12. Apparatus for grinding an optical surface as set forth in claim 11 wherein is provided means for rotating said optical surface 90° relative to the grinding tool to thereby permit reciprocal motion of the grinding tool along the optical surface in two substantially perpendicular directions.

13. Apparatus for grinding an optical surface as set forth in claim 11 wherein a plurality of grinding tools are provided independently resiliently mounted in a row for independent motion in the direction perpendicular to the platform in response to surface configurations of an optical surface mounted on said platform.

14. Apparatus for grinding an optical surface comprising: a lens grinding platform adapted for retaining an optical surface for grinding; at least one grinding tool spaced from said platform in a position to contact an optical surface mounted on said platform; means for reciprocating said grinding tool back and forth along said platform; a freely hinged parallelogram structure at one end of which the grinding tool is mounted, the opposite end of said parallelogram structure being connected to said reciprocating means; and resilient biasing means for applying resilient pressure by the grinding tool against an optical surface mounted on said platform while permitting motion of the grinding tool in a direction generally perpendicular to the platform in response to surface configurations.

15. Apparatus for grinding an optical surface as set forth in claim 14 wherein is provided a cam and cam follower, one of which is connected to said parallelogram structure in turn connected to the reciprocating means while the other is mounted in a stationary position for engaging the parallelogram structure.

16. Apparatus for grinding an optical surface as set forth in claim 15 wherein the configuration of said camming surface produces motion of the grinding tool substantially conforming in cross-sectional shape to the cross-sectional shape of said optical surface.

17. Apparatus for grinding an optical surface on a lens element comprising: a lens grinding platform adapted for retaining a lens element for grinding; a plurality of grinding tools spaced from said platform in a position to contact the surface of a lens element mounted on said platform; means for reciprocating said grinding tools back and forth along said platform; and resilient biasing means for applying resilient pressure by each grinding tool against a lens element mounted in said platform while permitting independent motion by each of the grinding tools in a direction perpendicular to the platform in response to surface configurations of a lens element mounted on said platform.

18. Apparatus for grinding an optical surface on a lens element as set forth in claim 17 wherein is provided means for rotating said lens element 90° relative to the grinding tools to thereby permit reciprocal motion of the grinding tools along the surface of the lens element in two substantially perpendicular directions.

References Cited

UNITED STATES PATENTS

| | | | |
|---|---|---|---|
| 14,751 | 11/1919 | Brockbank | 51—284 |
| 1,343,522 | 6/1920 | Robertson et al. | 51—284 |
| 2,435,126 | 1/1948 | Burch | 51—67 |
| 2,458,384 | 1/1949 | Jeffree | 51—284 |
| 3,169,350 | 2/1965 | Corman | 51—67 |

WILLIAM R. ARMSTRONG, Primary Examiner

U.S. Cl. X.R.

51—284; 351—17